United States Patent
Kelman et al.

(10) Patent No.: US 10,135,933 B2
(45) Date of Patent: Nov. 20, 2018

(54) APPARATUS AND METHOD FOR GENERATING DYNAMIC SIMILARITY AUDIENCES

(71) Applicant: Triad Digital Media LLC, St. Petersburg, FL (US)

(72) Inventors: Daniel Kelman, Boulder, CO (US); Mourad Touzani, Clearwater, FL (US)

(73) Assignee: TRIAD DIGITAL MEDIA LLC, St. Petersburg, FL (US)

( * ) Notice: Subject to any disclaimer, the term of this patent is extended or adjusted under 35 U.S.C. 154(b) by 213 days.

(21) Appl. No.: 15/295,166

(22) Filed: Oct. 17, 2016

(65) Prior Publication Data

US 2017/0111461 A1    Apr. 20, 2017

Related U.S. Application Data

(60) Provisional application No. 62/242,296, filed on Oct. 15, 2015.

(51) Int. Cl.
| | |
|---|---|
| *H04L 29/08* | (2006.01) |
| *G06F 15/16* | (2006.01) |
| *G06F 17/30* | (2006.01) |
| *G06Q 30/00* | (2012.01) |
| *G06F 15/173* | (2006.01) |

(52) U.S. Cl.
CPC .......... *H04L 67/22* (2013.01); *G06F 17/3053* (2013.01); *G06F 17/30507* (2013.01); *G06F 17/30598* (2013.01); *G06F 17/30867* (2013.01); *G06Q 30/00* (2013.01)

(58) Field of Classification Search
CPC ................... H04L 29/08; G06F 15/16

USPC ........................................................ 709/224
See application file for complete search history.

(56) References Cited

U.S. PATENT DOCUMENTS

| | | | |
|---|---|---|---|
| 2006/0271671 A1* | 11/2006 | Hansen ............. | G06F 17/30899 709/224 |
| 2008/0275980 A1* | 11/2008 | Hansen ................ | G06Q 30/02 709/224 |
| 2009/0327026 A1* | 12/2009 | Bistriceanu ............ | G06Q 30/02 705/7.33 |
| 2012/0123862 A1 | 5/2012 | Kurra et al. | |

(Continued)

OTHER PUBLICATIONS

International Search Report in corresponding application PCT/US2016/057330, dated Feb. 9, 2017.

*Primary Examiner* — Jude Jean Gilles

(57) ABSTRACT

A first plurality of data points related to visitors to at least one website is received. The data points comprise at least an identification of the visitor and an interaction of the visitor with the website. A target audience comprising at least some of the visitors having a known, desired interaction and a plurality of selection rules defining tolerances for a similarity audience are received. The selection rules include a correlation score and an audience composition index. A similarity audience from a plurality of clusters defined by a number of unique visitors is selected wherein at least some of the unique visitors share at least one interaction in common, and the similarity audience comprises at least one cluster of the plurality of clusters satisfying the plurality of selection rules. Digital content is generated for electronic transmission to a plurality of computing devices associated with members of the similarity audience.

20 Claims, 5 Drawing Sheets

(56) References Cited

U.S. PATENT DOCUMENTS

| | | | |
|---|---|---|---|
| 2012/0158951 A1* | 6/2012 | Seifert | G06Q 30/02 709/224 |
| 2014/0196081 A1 | 7/2014 | Emans et al. | |
| 2014/0280816 A1* | 9/2014 | Field | H04L 67/14 709/223 |
| 2015/0058119 A1 | 2/2015 | Atli et al. | |
| 2015/0066629 A1* | 3/2015 | Seiler | G06Q 30/0244 705/14.43 |
| 2015/0287091 A1 | 10/2015 | Koran | |

* cited by examiner

APPARATUS AND METHOD FOR GENERATING DYNAMIC SIMILARITY AUDIENCES

CROSS-REFERENCE TO RELATED APPLICATION(S)

This application claims priority to U.S. Provisional Patent Application No. 62/242,296, filed Oct. 15, 2015, the contents of which are incorporated herein in their entirety by reference.

TECHNICAL FIELD

This disclosure relates to particular techniques to generate audiences or targets for on-line items, such as consumers for on-line digital content. It addresses a problem of sparse data that is related to the large amount of items available on-line as compared to the few consumers for any individual item, allowing the sparse data to be clustered using techniques that provide more accurate targets, reducing the amount of on-line digital content that is generated by a source and transmitted over a network to those unlikely to have any interest.

BACKGROUND

Publishers, including authors, advertisers and the like, may identify potential consumers of goods or services using "look-alike" targeting. In such targeting, a group of content consumers that exhibit known behavior are used to identify others that are similar to the group. In this way, the providers hope to find more consumers who are likely to exhibit that same behavior in the future.

SUMMARY

Look-alike targeting can be performed with varying degrees of accuracy. Strong, statistical accuracy is associated with slow, complex techniques, often involving labor-intensive deployment. Quick techniques that rely upon simple statistics instead of training are relatively easy to deploy but generally lack accuracy and precision in specifying potential targets.

In contrast, the teachings herein create target consumers of on-line digital content, also called look-alike audiences herein, at near real-time speed. Clusters of consumers are generated using a clustering technique that addresses the problem of sparse data unique to the consumption of on-line digital content. The look-alike audiences are generated using the clusters and have relatively high targeting accuracy and compositional lift indexes, resulting in more efficient use of network resources to transmit the desired digital content.

The technique for generating a dynamic similarity audience described herein may be implemented in a pre-built software package that can be embedded as part of a wider tool that manages on-line digital content or may be a stand-alone software application that can be run without training, etc., by technical staff. Other ways to implement the technique are possible and are described in detail below.

One method described herein includes receiving, for at least one website, a first plurality of data points related to each visitor of a first plurality of visitors to the website, the first plurality of data points comprising at least an identification of the visitor and an interaction of the visitor with the website, receiving a target audience comprising at least some of the first plurality of visitors having a known, desired interaction, and receiving a plurality of selection rules defining tolerances for a similarity audience, the plurality of selection rules including a correlation score and an audience composition index. The method also includes selecting a similarity audience from a plurality of clusters defined by a number of unique visitors, at least some of the unique visitors sharing at least one interaction in common, and the similarity audience comprising at least one cluster of the plurality of clusters satisfying the plurality of selection rules, and generating, for electronic transmission to a plurality of computing devices associated with members of the similarity audience, digital content.

Another method described herein includes receiving, for at least one website, a first plurality of data points related to each visitor of a first plurality of visitors to the website, the first plurality of data points comprising at least an identification of the visitor and an interaction of the visitor with the website, performing a clustering algorithm that generates the plurality of clusters using the first plurality of data points as input, each cluster of the plurality of clusters defined by a number of unique visitors and at least some of the unique visitors sharing at least one interaction in common, and generating, for each cluster of the plurality of clusters, at least one assignment rule that associates a behavior common to at least some of the unique visitors in the cluster with the cluster. The method also includes providing the assignment rules to an updating process that assigns each visitor of a second plurality of visitors to the plurality of clusters using the assignment rules, and providing the plurality of clusters to a targeting process that generates a similarity audience formed of at least some of the clusters and provides, via electronic transmission, at least some members of the similarity audience with digital content.

An apparatus described herein includes a memory and a processor. The processor is configured to execute instructions stored in the memory to receive, for at least one website, a first plurality of data points related to each visitor of a first plurality of visitors to the website, the first plurality of data points comprising at least an identification of the visitor and an interaction of the visitor with the website, receive a target audience comprising at least some of the first plurality of visitors having a known, desired interaction, receive, responsive to a user input, a plurality of selection rules defining tolerances for a similarity audience, the plurality of selection rules including a correlation score and an audience composition index, select a similarity audience from a plurality of clusters defined by a number of unique visitors, at least some of the unique visitors sharing at least one interaction in common, and the similarity audience comprising at least one cluster of the plurality of clusters satisfying the plurality of selection rules, and generate, for electronic transmission to a plurality of computing devices associated with members of the similarity audience, digital content.

Details of these embodiments, modifications of these embodiments and additional embodiments are described below.

BRIEF DESCRIPTION OF THE DRAWINGS

The description herein makes reference to the accompanying drawings wherein like reference numerals refer to like parts throughout the several views.

DETAILED DESCRIPTION

Figure 1:
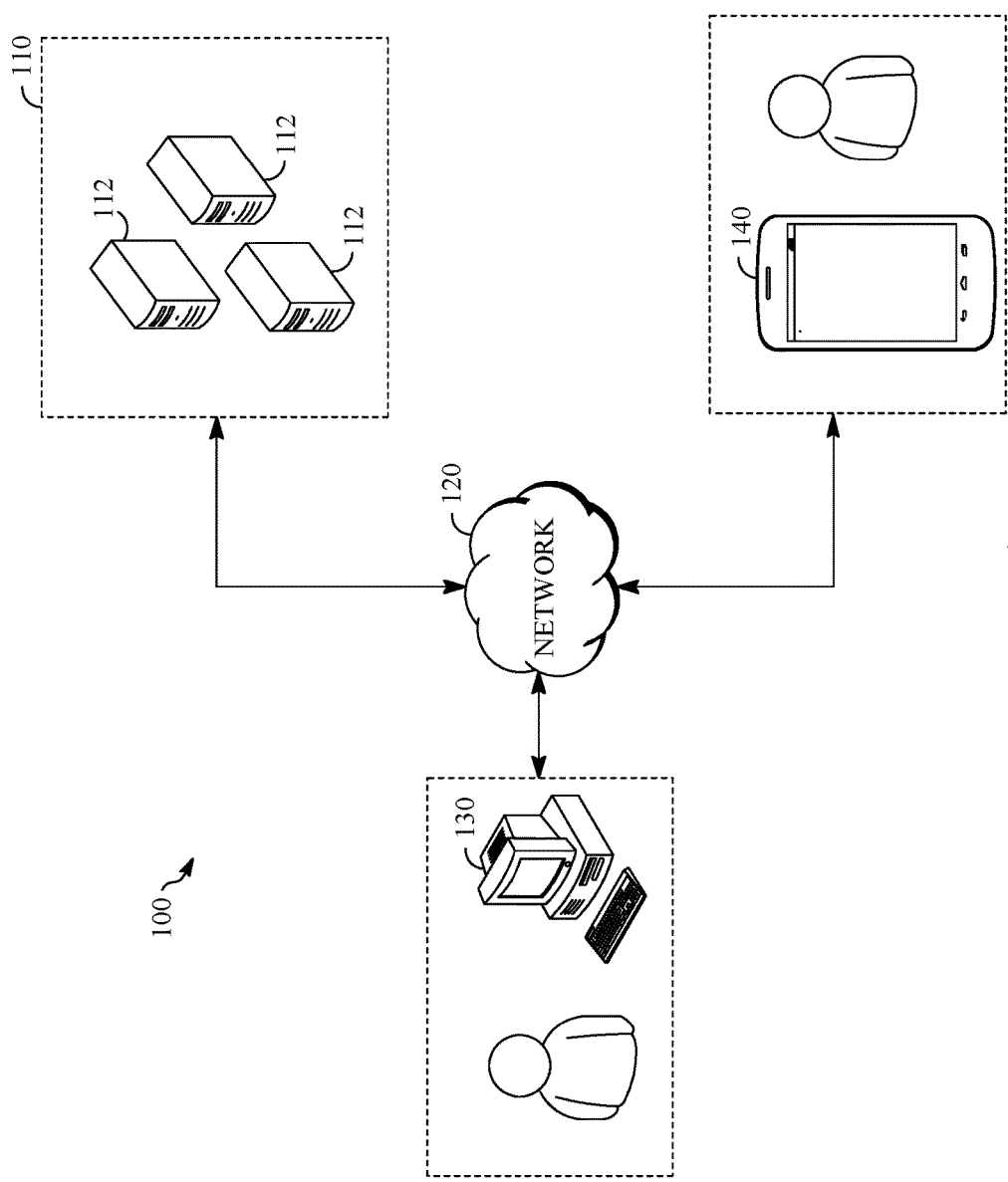
FIG. 1 is a block diagram showing an example of a network environment in which embodiments of the teachings herein may be incorporated.

FIG. 1 is a block diagram that shows an example of a network environment 100 in which implementations of this disclosure may be incorporated. The network environment 100 may include a computing system 110 having one or more computing devices 112 coupled through a network 120 to one or more user devices that are associated a user, such as user devices 130, 140.

As part of the computing system 110, various configurations of the computing devices 112 can be utilized. For example, certain of the operations described herein may be performed by the computing devices 112 in the form of multiple groups of server computers that are at different geographic locations and may or may not communicate with one another, such as by way of the network 120. In some implementations of the network environment 100 described herein, the computing system 110 includes only one computing device (e.g., a computer) 112 operating with multiple processing cores. In other implementations of the network environment 100, multiple computing systems 110 may be included as discussed below.

The network 120 can be one or more communication networks of any suitable type that provides communication between computing devices. For example, the network 120 may be, or include in combination, wireless networks, wired networks, local area networks, wide area networks, cellular data networks and the Internet. One or more of the computing systems 110 may communicate with each other and with the user devices 130, 140 via the network 120. In some implementations, the user devices 130, 140 may communicate with each other via the network 120.

In this example, the user device 130 is a desktop computer and the user device 140 is a smartphone. The user devices 130, 140 may be associated with a single user or a respective user. While two user devices 130, 140 are shown, hundreds of thousands of users and hence millions of devices may be connected to the computing system 110 through the network 120. Other types of user devices may also be part of computing system 110, such as tablet computers, laptop computers, wearable computing devices, etc. User devices, such as the user devices 130, 140, are computing devices may be used to connect to, browse through and obtain digital content available through, e.g., webpages. As a result, digital content transmitted through the network 120 can consume significant resources of the network 120 (and the network environment 100) when large numbers of user devices are targeted.

As explained in more detail hereinafter, the network environment 100 is configured to collect data regarding on-line behavior through the network, generate rules regarding that behavior, and use those rules to target digital content to particular users or groups of users. These functions may be performed in the context of an application that is used at one or more of the computing devices 112 and is developed, published by, or otherwise attributable to a developer such as one associated with the computing system 110. Use of the application at a computing device can include any or all of outputting information for display at the device, receiving user input via an input device at the device and executing computer program instructions at the device. In some implementations, however, the application can be utilized at the user device without executing program instructions at the device, such as by executing program instructions for the application at a different computing device.

Figure 2:
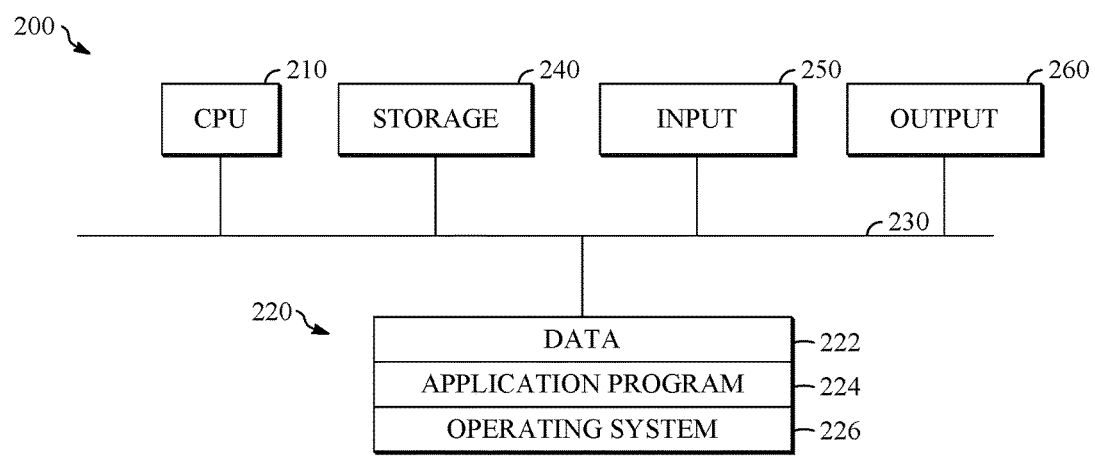
FIG. 2 is a block diagram showing an example of a hardware configuration for a computing device that may be used to implement the teachings herein.

FIG. 2 is a block diagram of an example of a hardware configuration for a computing device 200 that can be used to implement any or all of the computing devices 112, for example. The same hardware configuration or a similar hardware configuration can be utilized to implement user devices connected to the network 120. In some implementations of the computing system 110, the hardware configuration of one or more of the computing devices 112 is simplified to be used solely for calculations or storage such as by omitting certain components, e.g., a display, keyboard, etc. For example, some of the computing devices 112 may be part of a storage system, such as a cloud storage system that stores browsing and on-line shopping data.

The computing device 200 as shown includes a CPU 210 that may comprise one or more central processing units. Alternatively, the CPU 210 may be any other type of device, or multiple devices, capable of manipulating or processing information now-existing or hereafter developed. Although a single processor, e.g., the CPU 210, is shown, speed and efficiency in generating dynamic similarity audiences may be improved through the use of more than one processor. For example, one or more processors may generate rules while others apply the collaborative filter described herein.

The computing device 200 also includes a memory 220. The memory 220 may comprise any suitable non-transitory memory, such as random access memory (RAM), read-only memory (ROM), etc. The memory 220 may store data 222 that can be accessed by the CPU 210 using a bus 230. The memory 220 can further store one or more application programs 224 and an operating system 226. The application program 224 may include software components in the form of computer executable program instructions that cause the CPU 210 to perform some or all of the operations and methods described herein.

An optional storage device 240 is shown and has the form of any suitable non-transitory computer readable medium, such as a hard disc drive, a memory device, a flash drive or an optical drive. In this way, the storage device 240 may be a removable storage device.

One or more input devices 250, such as a keyboard, a mouse, a microphone or a gesture-sensitive input device, may receive user inputs and forward output signals or data indicative of the user inputs to the CPU 210. Further, one or more output devices 260 may be included. One output device 260 may be a display device, such as liquid crystal display (LCD) or a cathode-ray tube (CRT), which allows output to be presented to a user. Certain of the devices 250, 260 may be an interface for both input and output communications. For example one of the devices 250, 260 may be an interface that receives data along the bus 230 from other devices coupled to the network 120 and then transmits output from the operations and methods herein along the bus 230 to other devices coupled to the network 120.

Although FIG. 2 depicts the CPU 210 and the memory 220 as being integrated into a single unit, other configurations can be utilized. The operations of the CPU 210 can be distributed across multiple machines (each machine having one or more of processors) that can be coupled directly or across a local area or other network. The memory 220 can be distributed across multiple machines or devices such as network-based memory or memory in multiple machines performing operations that may be described herein as being performed using a single computer or computing device for ease of explanation. Although the bus 230 is depicted as a single bus, multiple buses can be utilized. Further, the storage device 240 can be a component of each computing device 200 or can be a shared device that is accessed via a network. The computing device 200 thus be implemented in a wide variety of configurations.

Figure 3:
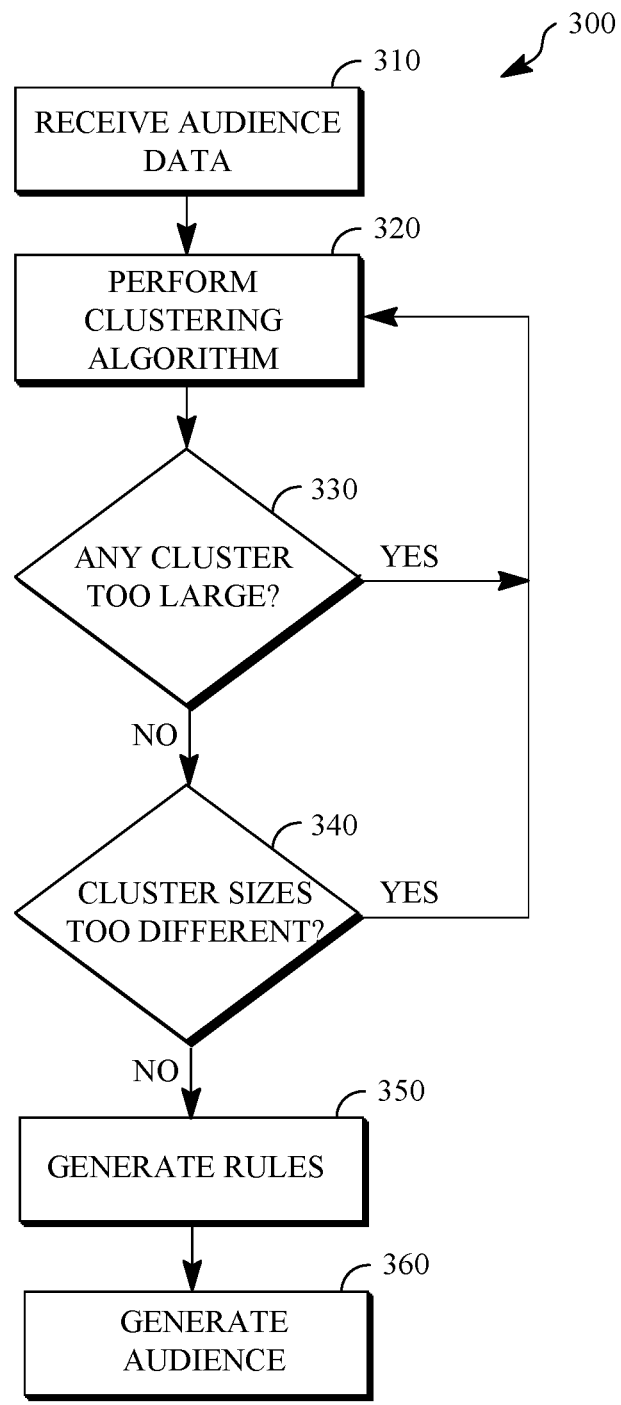
FIG. 3 is a flow chart showing an example of a clustering process for use in generating dynamic similarity audiences according to the teachings herein.

FIG. 3 is a flow chart showing an example of a clustering process 300 for generating dynamic similarity audiences according to the teachings herein. The process 300 describes the steps and operations by which clusters may be generated, from which dynamic similarity audiences are further generated. Similarity audiences are one or more targets or sets of targets that are found by analyzing the behavior of consumers (also called an audience herein) for an on-line site and finding those of the audience that are similar to other members of the audience whose behavior in one or more aspects it would be desirable to replicate. The use of the term dynamic refers to the speed of the calculations after an initial generation of clusters and rules described below. Generating the audiences discussed with reference to FIG. 5 below can take under two seconds in some implementations.

The operations described in connection with the process 300 can be performed at one or more computers or computing devices 200, such as a computing device 112 of the computing system 110. When an operation is performed by one or more computers, it is completed when it is performed by one computer. The operations described in connection with the process 300 can be embodied as a storage device in the form of a non-transitory computer readable storage medium including program instructions executable by one or more processors that, when executed, cause the one or more processors to perform the operations. For example, the operations described in connection with the process 300 could be stored at the memory 220 of the computing device 200 and be executable by the CPU 210 of the computing device 200.

The process 300 is shown as a series of operations or steps for simplicity of explanation and for consistency in presentation. Although the figures and descriptions herein include sequences or series of steps or stages, they may occur in various orders or concurrently. Additionally, methods disclosed herein may occur with additional elements not explicitly presented and described herein. Furthermore, not all steps described herein may be required to implement a method in accordance with this disclosure.

A clustering process is desirable here due to a problem that is unique to on-line behavior vis-à-vis content—the problem of sparse data. More specifically, existing techniques that recommend on-line digital content to consumers rely upon matching users who read, accessed, bought or shopped for a common item. The on-line behavior of the matched users is then used recommend items other than the common item. For example, shoppers for a common item may be match, and then other items may be recommended through on-line digital content based on frequently bought items from the matched users. This technique generates a small pool of targets in many situations because data associated with the common item is most often a very small fraction of the available data for consumer on-line behavior. One way in which this problem may be addressed is by using category subsets so that the target user is compared to a set of consumers within the category. However, this does not provide recommendations outside of the category. The sparse data thus results from many users displaying only a few behaviors (e.g., browsing and/or purchasing) across a broad group of published content (e.g., items or categories), such as thousands of items or categories represented by on-line digital content. This can be illustrated by the on-line purchase of dog food. While about 45% of U.S. households own dogs, only a few percent of site visitors may shop for dog food at any particular site. Likely dog-food shoppers are desirably found from the other, non-dog related parts of the site. Relying upon common shopping behaviors vis-à-vis the particular item of interest will omit potential members of a look-alike audience.

The process 300 includes a clustering technique that divides data into meaningful or useful groups or clusters. This can reduce potentially thousands of departments, categories and sub-categories involved in both browsing and purchase behaviors into a much smaller set of clusters from which a meaningful similarity audience may be generated.

The process 300 starts with the receipt of audience data at 310. Audience data may include data regarding each unique visitor to a website, for example a commercial website that sells products or services or otherwise publishes content for visitors to the website. This website is referred to as the target website so as to distinguish it from other websites. The term audience is used to more broadly convey that the desired sources of information encompass more than those visitors that purchase products or services, but include visitors that browse but do not make purchases. Audience data may be limited in time period at step 310. For example, the audience data may reflect visitors to the target website over a 30-day period.

The data collected per visitor (e.g., per member of the audience) may include data related to the target website and data unrelated to the target website. Data related to the target website may be the number of page views and the pages viewed, products or services viewed, products or services purchased, number of unique visits to the target website, any likes or recommendations of a page, product or service on the target website, the length of time spent on pages and/or the target website as a whole, etc. The data related to the target website may relate to viewed content across hundreds or thousands of departments, categories and sub-categories of content as well as specific brands, authors, items, etc. Specific search-words (also called keywords) entered by a visitor as part of search-term strings may also form audience data. Data unrelated to the target website but associated with a visitor may be other websites the visitor browsed before or after the target website on each visit, length of time on other websites or webpages, the physical location of the visitor, etc. Purchase data from online transactions or off-line, in-store transactions, associated with a user could also be used as input to the clustering. Such data may be on-boarded by third-party relationship management match providers. User-level data obtained for purchase or license from third-party, digital-data vendors could also be used in as part of the data for clustering. The data may be obtained from websites as data collected using cookies. The audience data may be stored in any non-tangible storage medium for archiving and retrieval.

Audience data may be received responsive to a request by the computing device 200 from an application program. The request may be made by a user at an input device 250 for data related to the audience for one or more websites. The audience data may be received from a remote source, such a different one of the computing devices 112, by transmission over the network 120. Audience data may be received at least in part from a local storage device such as the storage device 240.

At 320, a clustering algorithm is performed using the received audience data. Some desirable features that inform what type of clustering algorithm should be used. For example, many clustering techniques are designed to create discrete clusters, where members can only be assigned to a single cluster. It is desirable here to use an algorithm where audience members (i.e., unique visitors) can be assigned to more than one cluster. Further, because the most frequent situation is the sparsely populated data environment described above, it is desirable that the algorithm be able to build cohesive audience clusters in such an environment.

Several partitioning, hierarchical, distribution, and density-based clustering algorithms were used on sample data. While the techniques were able to cluster the data, the inventors found that the resulting clusters often produced less than satisfactory results. In some cases, too many clusters formed that made meaningful comparisons difficult. In other cases, clusters combined too many different attributes (e.g., too few clusters were formed).

In the examples described herein, a spherical k-means clustering is used at the clustering algorithm at 320. The audience data input into the clustering algorithm includes a defined number of days of browsing, search, and purchase behavior at a target site. In some cases, 30 days is an appropriate number of days. Browsing and purchase behavior of a visitor is based on departments, categories and sub-categories viewed on the site and is considered at all levels of taxonomy (department, category, sub-category and so on). Most commonly, content publishers of a site have between three to five layers of taxonomy, but the number or merchandise classification layers can be greater or fewer. Search behavior is the use of specific words within full strings entered as part of a site search by a visitor. In the examples described herein, the site is an e-commerce site selling various physical products. However, the site may be any site that publishes content on-line for reading, browsing, or purchase, such as a news site, etc.

The spherical k-means clustering algorithm at 320 is most commonly an interative clustering algorithm (or process). Initially, the audience for the site based on the audience data is split into a fixed number of clusters k based on the statistical elbow method. That number k is a limit beyond which increasing the number of clusters would no longer be useful, and the splits would be somewhat arbitrary. This output is referred to as the initial clusters herein.

The initial clusters generally have varying sizes as measured by the number of unique visitors in each where here a unique visitor can be located within one than one cluster. Once the initial clusters are formed at 320, those clusters may be subjected to tests related to their size. At 330, a query occurs to determine whether any one cluster is too large. Often, the largest clusters of the initial clusters may be significant size—containing more than 10% or 15% of the total audience. Large clusters often lack strong distinction from the total audience, and may not perform well in the later correlation processing. That is, they may produce a weak correlation with a known audience as described with reference to FIG. 5 below. Even with a strong correlation, large clusters generally produce a lower compositional lift index than smaller clusters with an equivalent correlation. Thus, large clusters may provide a valid target audience, but they may not generate a similarity audience that is worth the increased cost in media spending and network or computing resources.

A cluster may be too large at 330 when the size of the cluster exceeds a maximum cluster size limit, that is, when more than a defined number of the visitors are assigned to the cluster. The number may be a defined percentage found by experimentation or may be a defined percentage equal to an arbitrary number. In one implementation, the maximum cluster size limit is 10 percent. If any cluster is too large, processing returns to 320 to refine the results of the clustering algorithm. In this example, clusters found to be too large at 330 are separated out and broken down using another k value for the clustering algorithm at 320. Because these clusters are a sub-set of a larger set of clusters, it may be desirable to use a preset number for k in this second clustering pass that depends on how many clusters are too large as compared to the total and what the maximum cluster size limit is. Here, for example, each large cluster may be broken down into five smaller ones. If any of the new clusters is still larger than the maximum limit at 330, it may be sub-clustered again at 320 using the same or a smaller k value. In brief, each cluster of greater size than the minimum may be broken into small clusters by, e.g., running the same spherical clustering algorithm while treating the individual cluster as a whole population and seeking "sub-clusters" from within that individual cluster.

The clusters may also be checked against a minimum size. Here, they are not because this example of clustering has an initial stage that is dictated by a limit to the size of the smallest clusters (e.g., using the statistical elbow method). However, a different technique may make a test for a minimum size (in addition to or as an alternative to the test for the maximum size) desirable. The minimum size may be expressed as a percentage and may be developed by experimentation. Too few members assigned to a cluster may omit potentially valuable targets from the final similarity audience.

If the clusters pass any size queries regarding the individual clusters such as the one at 330, the process 300 advances to 340. An optional query regarding all cluster sizes occurs at 340. Specifically, the process 300 inquires at 340 as to whether the cluster sizes are too different from each other. That is, the sizes of the various clusters are compared to each other. If the sizes vary from the median by more than a specified deviation in response to the query at 340, the process 300 returns to step 320 to refine the results of the clustering algorithm. In this case, refining the results of the clustering algorithm may involve increasing the initial k value or, less desirably, reducing the number of data points from the audience data using in the clustering by grouping layers of the taxonomy, limiting the number of unique keywords considered, etc. This is described as an optional query because, dependent on the steps of process 300, the resulting clusters may not vary from the median without expressly comparing their sizes. For example, in the process 300, the combination of dictating the initial stage based on a minimum cluster size and sub-clustering when clusters are above a maximum size (e.g., as a percentage of total audience) results in clusters within a useful range of sizes (i.e., having a defined range of a total number of unique visitors).

The clusters that satisfy the queries at 330 and 340 reduce the possible number of attributes used to target an audience from thousands of page classifications and tens of thousands of search words into, in certain examples, a few hundred clusters. This addresses the sparse data problem that otherwise would produce too few relevant target consumers. The clusters may be used to generate rules (also referred to as definitions) at 350. Namely, the rules describe what particular behavior (e.g., on-line behavior such as browsing behavior or keyword searching behavior) is associated with each cluster. That is, each cluster is associated with at least one behavior in common among the data points of the audience data that forms the cluster. In many cases, the data points may share more than one behavior in comment. The contextual information associated with the behavior(s) may be generate the rules as example-based classifiers that can are used to classify subsequent data points into clusters. The rules may be in the form of strings for comparison with contextual information of the new data points. The rules may be in the form of arithmetic formulas, binary operations, or both. The rules may be in the form of one or more matrices per cluster. The rules may be used as part of an update process described with respect to FIG. 4 below.

Once clustering is complete, the set of clusters can be used over time with periodic updates to generate one or more similarity audiences at 360. Generating similarity audiences is described with respect to FIG. 5 and may be associated with a separate application that receives the clusters (either in their entirety or with a subset of the data in each) and optionally the generated rules as input.

Figure 4:
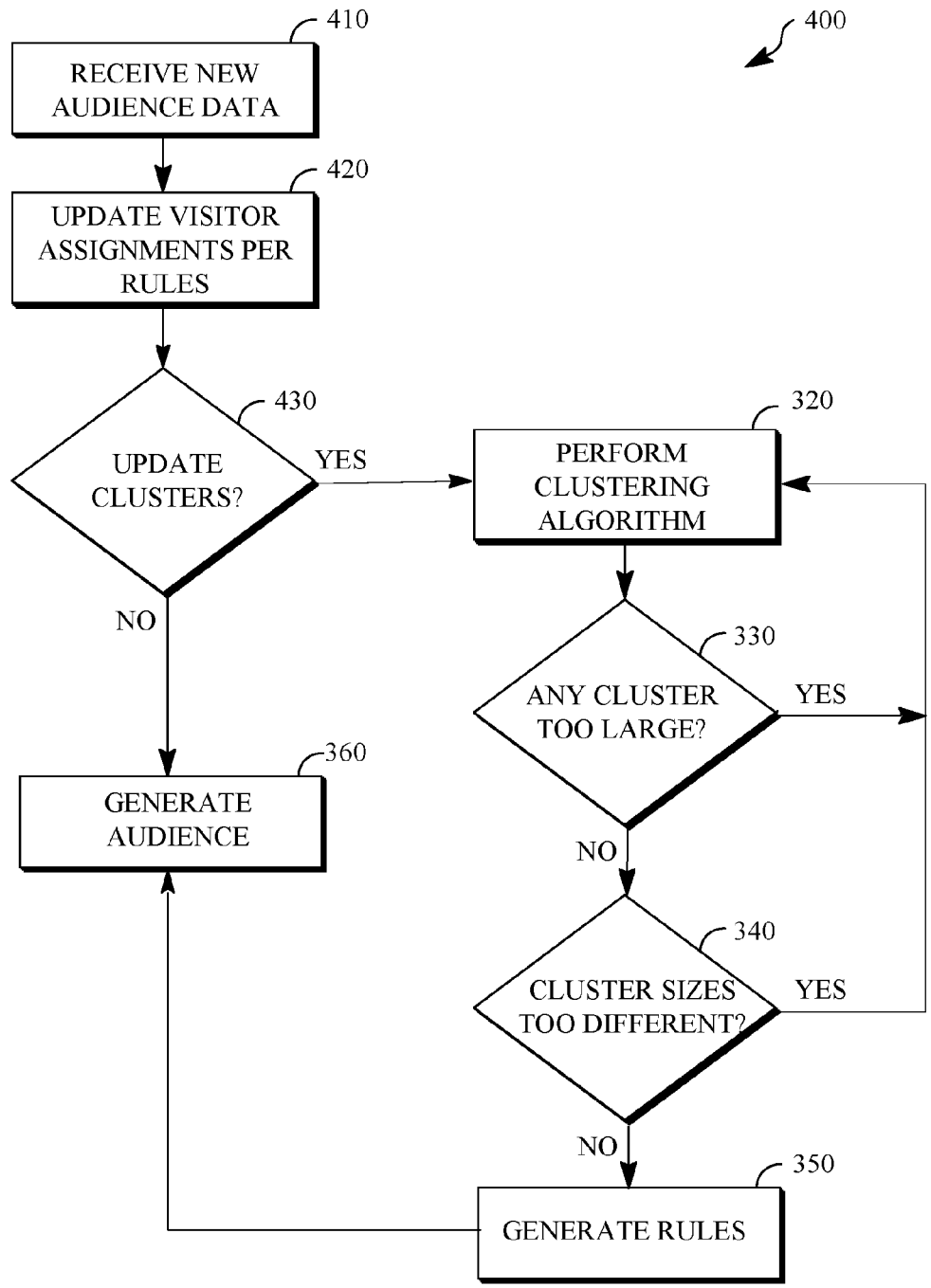
FIG. 4 is a flow chart showing an example of updating the clusters resulting from the process of FIG. 3.

Referring now to FIG. 4, updating the data within clusters and updating the clusters themselves is described. More generally, FIG. 4 is a flow chart showing an example of a process 400 for updating the clusters resulting from the process 300 of FIG. 3. As with the process 300, the operations described in connection with the process 400 can be performed at one or more computing devices 200, such as a computer or computing device 112 of the computing system 110. The operations described in connection with the process 400 can be embodied as a storage device in the form of a non-transitory computer readable storage medium including program instructions executable by one or more processors that, when executed, cause the one or more processors to perform the operations. For example, the operations described in connection with the process 400 could be stored at the memory 220 of the computing device 200 and be executable by the CPU 210 of the computing device 200.

The process 400 is shown as a series of operations or steps for simplicity of explanation and for consistency in presentation. Although the figures and descriptions herein include sequences or series of steps or stages, they may occur in various orders or concurrently. Additionally, methods disclosed herein may occur with additional elements not explicitly presented and described herein. Furthermore, not all steps described herein may be required to implement a method in accordance with this disclosure. Variations in the process 400 are possible. For example, the process 400 describes updating clusters as part of a periodic process of receiving new audience data and updating the visitors within particular clusters. However, updating clusters and updating the visitors within existing clusters may be processes that occur separately without referencing the other process. Further, updating clusters may not be a periodic process or may not be solely a periodic process. Clusters may be updated based on triggering events. Such triggering events could include, for example, significant changes to a site such as additions of new taxonomy categories (e.g., new site content or new categories of content) or taxonomy reorganizations by the publisher of the site.

At 410, new audience data is received. New audience data may be received from the original source of audience data at 310, or may be obtained from another source. The new audience data may be periodically collected over a shorter period of time than the original audience data, such as over a defined period of time of 24 hours. The new audience data may include data points associated with new, unique visitors to the website, and may also include data points associated with new visits by one or more previously-identified visitors.

The assignment of the new audience data to clusters may be updated at 420 according to the rules generated at 350. New visitors may be assigned to one or more clusters based on their recent behavior, and previously-known visitors may be assigned to new clusters based on their incremental behavior using the rules from 350. For example, the rules may be generated as Boolean rules that define if a visitor (e.g., an audience member) should be assigned to one or more specific clusters. Such rules may be, for example, "users who view a specific URL (corresponding to "Organic Dog Food") are assigned to cluster id 164," or "users who used the search word "red" are assigned to cluster id 081." Assignment may be done by a cookie id that defines the user. By using the rules for assignment of the new data points, the clusters are maintained with a degree of accuracy for use with reduced computational burden over re-generating the clusters each time new data is received.

At 420, previously-known visitors are not necessarily removed from clusters to which they have been assigned. However, they may not be reassigned to a cluster—they could "fall out" of the cluster. More specifically, in order to keep the identified visitors within clusters relatively current, the updated assignments at 420 may be done on a periodic basis (such as daily), with data for a like period of time at the beginning of the period of time used to generate the clusters removed. In other words, a rolling period for the data (e.g., 30 days) may be considered. Browsing behaviors and search behaviors aging past 30 days in this example would cease to impact cluster assignment(s) of an individual visitor. Expiring behavior of a visitor (that is, behavior that is removed when new audience data is received) may result in the visitor being omitted from a cluster to which they were previously assigned.

This rolling period of web browsing and search behaviors determining cluster membership for each visitor can result in individual memberships in clusters slowly changing as new browsing and search behaviors occur, while old behaviors expired. In a like manner, the internal correlative relationships between categorical browsing behaviors or search words would evolve over time. New correlations between categories or search words would emerge, while some old internal correlations would dissipate. Accordingly, there is desirably the generation of a new clustering system, with new rules, after some period of time. This is referred to herein as updating the clusters as opposed to updating the assignments to the clusters. Updating the clusters could occur periodically.

At 430, the process 400 queries whether the time for updating clusters has been reached. For example, the clusters may be updated after the original data is completely replaced, such as for example after 30 days of new audience data is received. Alternatively, the clusters may be updated after a longer period, such as quarterly after the clusters are defined and the rules generated as in FIG. 3. As mentioned, clusters may also be updated for certain triggering events. Optionally, triggering events may be tied to the audience data. For example, one triggering event may be the addition of at least a large number of new visitors to the site, such as a number exceeding a defined limit. Another triggering event may be a significant change in the number of members or visitors forming the audience.

If the clusters are not to be updated, a similarity audience may be generated at any point in time at 360. The actions at 360 in the process 400 may be the same as those at 360 in the process 300, and they are described in more detail below with respect to FIG. 5. If instead the rules are to be updated as indicated by the response to the query at 430, the process 400 advances to perform a clustering algorithm at 320, check cluster sizes at 330 and optionally at 340, and generate rules at 350. The actions at 320, 330, 340, and 350 may be identical to those in the process 300, so their descriptions omitted here. Again, after the rules are generated at 350, the process 400 may advance to generate a similarity audience at 360.

The clustering as described provides at least two benefits. First, it puts all users in a sparse data set into a densely-populated data set that will work well with a collaborative filtering algorithm described in more detail with respect to FIG. 5. Second, it pre-classifies all users into pre-made clusters that can be quickly and easily deployed for targeting once collaborative filtering is complete. This reduces the computational burden at the computing device of the end user that would otherwise result from the large amount of data particular to on-line behavior.

Figure 5:
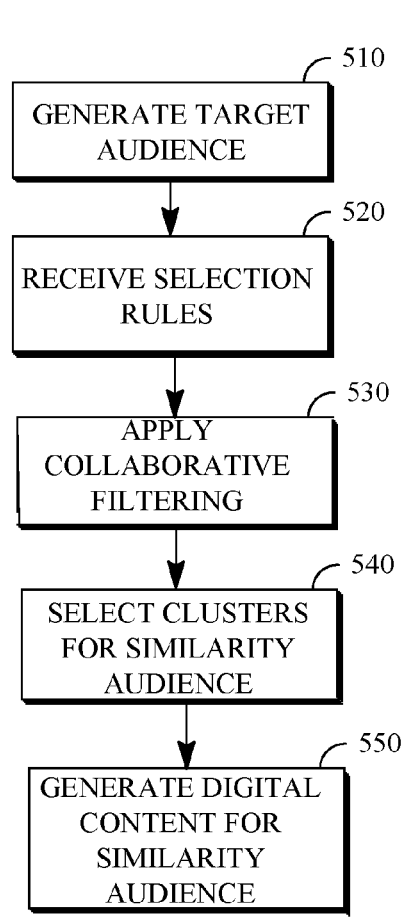
FIG. 5 is a flow chart showing an example of a process of generating and using similarity audiences based on the clusters of FIG. 3.

Referring now to FIG. 5, a flow chart showing an example of a process 500 of generating and using similarity audiences based on the clusters of FIG. 3 is described. The process 500 may implement step 360 of FIGS. 3 and 4 at any time after clusters are initially generated.

As with the processes 300 and 400, the operations described in connection with the process 500 can be performed at one or more computing devices 200, such as a computer or computing device 112 of the computing system 110. The operations described in connection with the process 500 can be embodied as a storage device in the form of a non-transitory computer readable storage medium including program instructions executable by at least one processor that, when executed, cause the processor(s) to perform the operations. For example, the operations described in connection with the process 500 could be stored at the memory 220 of a computing device 200 and be executable by the CPU 210 of the computing device 200. In some implementations, the process 500 occurs on one or more different computing devices 112 than those used for the processes 300 and 400 and includes respective user interfaces for input by a user.

The process 500 is shown as a series of operations or steps for simplicity of explanation and for consistency in presentation. Although the figures and descriptions herein include sequences or series of steps or stages, they may occur in various orders or concurrently. Additionally, methods disclosed herein may occur with additional elements not explicitly presented and described herein. Furthermore, not all steps described herein may be required to implement a method in accordance with this disclosure. Variations in the process 500 are possible.

At 510, a target audience is generated. In some implementations, a target audience may be generated based on a request from a user through an input to a data management platform. A data management platform (DMP) allows a user to manage one or more on-line audiences based on historical site browsing behavior and campaign history of individual on-line audience members. Specifically, a user may create a target audience based on past browsing behavior such as page and page category views, frequency of views and date ranges of those views. The input data used to generate the target audience may be the same audience data received at 310. Accordingly, an initial step of the process 500, not shown, may be to receive audience data. The target audience is built using by filtering the audience data for the conditions established by the user. In an example, the user builds a target audience from those visitors who viewed any children's apparel shopping page five or more times in the last 30 days. More generally, the target audience comprises known consumers (browsers and/or purchasers) for a particular item represented by digital content (such as a product). This is also referred to as the known targeted behavior, and the known consumers of digital content are also referred to as users with known targeted behavior or the target audience.

At 520, the process 500 may receive selection rules. The selection rules may be received from a user through an input to the data management platform or may be default values. The selection rules are applied to find the best clusters for the input target audience. That is, the selection rules adjust the tolerances for the creation of the similarity audience. The user can increase or reduce a minimum correlation score applied to the clusters. The user can increase or reduce a compositional lift index applied to the clusters. These values can represent selection rules.

A minimum correlation score is a value used in the collaborative filtering process at 530 as discussed in more detail below. Generally, a low minimum correlation score is more inclusive—including more clusters. A high minimum correlation score is accordingly less inclusive.

A compositional lift index is also called a lift, an audience composition index or just the Index I. It may be calculated as:

$$I = \frac{\left(\dfrac{\text{Users with known targeted behavior who are members of selected look-alike clusters}}{\text{Users in selected look-alike clusters}}\right)}{\left(\dfrac{\text{Total users with known targeted behavior}}{\text{All users}}\right)} * 100.$$

The index I may be more generally denoted as $$I = \frac{\left(\dfrac{A}{B}\right)}{\left(\dfrac{C}{D}\right)} * 100,$$

where A is a number of visitors having a known, desired interaction within the similarity audience, B is a total number of visitors within the similarity audience, C is a total number of visitors having the known, desired interaction within the plurality of clusters, and D is a total number of visitors within the plurality of clusters.

As described in more detail below, the selected look-alike clusters are used to define the similarity audience.

This methodology (i.e., the calculation of the index above) is not as accurate in describing performance of the model (i.e., the similarity audience) as the measure targeting accuracy described below because the Index does not account for false-negatives. However, the Index is a good measure of the economic efficiency of the model. The Index compares how much better the model reaches true audience members versus randomly targeting across the total universe. For example, if 10% of a total audience has purchased Product X (Total users with known targeted behavior/All users), and 30% of the similarity audience contains purchasers of Product X (Users with known targeted behavior who are members of the selected look-alike clusters/Users in selected look-alike clusters), the index would be 300. This means that the desired audience members are reached at a rate three-times greater with the model as compared to targeting every site visitor. Thus, the Index provides a measure of the efficiency of transmitting digital content. While using a ratio of true positives to a sum of true positives and false positives, it does not account for false negatives as mentioned above and does not account for missed audience members. Adjusting the lift index as part of the process 500 can change the number of clusters, and hence the number of members, that form the similarity audience.

In summary, the rules at 520 can impose user-imposed limits in how strong of a correlation and how large of a lift index should be the minimum applied to determine if a cluster should be included in generation of the similarity audience. The rules are used in the selection of clusters described below with respect to 540.

Selection rules are useful as different goals for the distribution of digital content may need precisely targeted audiences versus broad audiences. Niche products may be targeted with a high degree of precision as compared to those products attractive to a broader audience. The goals may additionally or alternatively influence the trade-off between precision and scale. Campaigns designed to drive an immediate and relatively short-lived interest (and consumption) through the distribution of on-line digital content benefit from greater precision in the similarity audience, while campaigns designed to drive awareness benefit from a larger similarity audience. For example, higher similarity coefficients and lift indexes as specified by a user produce more precise similarity audiences, but such audiences have a relatively small size. Lowering the minimum similarity coefficient and lift index results in similarity audiences that are more general (that is, less specific a match), but more clusters will be included in a match such that the size of the similarity audience is larger.

The process 500 applies collaborative filtering at 530 using the target audience. That is, the characteristics or properties of the target audience are compared to those of the clusters to identify those of the clusters that best match the target audience. The collaborative filtering may find this best match using a cosine similarity index. Here, a cosine similarly index is calculated between the audience data of the target audience and that of the visitors forming each cluster. The higher the similarity index, the better the match between the groups and the higher the likelihood that the cluster members will engage in desired behavior responsive to on-line digital content (e.g., purchase a product, read an article, respond to a survey, etc.).

The values from the collaborative filtering at 530 are used at 540 to select clusters for generating the similarity audience. Stated simply, those clusters whose correlation scores from the collaborative filtering exceed the minimum selection from the rules are included in the look-alike audience to be targeted (also called the similarity audience). In some cases, the rules may be adjusted several times to determine an impact on total audience size and overall lift index. This would involve, for example, receiving as input different minimum correlation scores and/or index scores from a user interface.

More specifically, the values calculated at 530 (e.g., the cosine similarity indexes) are used to select clusters within the constraints provided by the selection rules as described with respect to 520. That is, the most similar clusters are considered in order for inclusion in the similarity audience. To the extent that a cluster can be considered as part of the similarity audience with the resulting similarity audience meeting the requirements of the selection rules, the cluster is included at 540. For example, a cluster may be included within the similarity audience as long as it has a cosine similarity index above a minimum value and does not result in the compositional lift index to vary outside of a specified range. In some cases, an order of preference of meeting the selection rules may be specified in the event the clusters cannot form a similarity audience meeting all selection rules. Alternatively or additionally, a selection rule may be established for selecting between clusters with similar calculated cosine similarity indexes. If a cluster cannot be included without violating the selection rules, it is omitted from the resulting similarity audience.

Once the similarity audience is selected, the process 500 may instruct that digital content be generated or issued for the similarity audience at step 550. For example, a source may generate a notice or other identifier, such as a hyperlink, regarding new website content to the individuals forming the similarity audience. The digital content itself may be distributed via email, web browser, or otherwise. Due to the selection technique of the clusters to form the similarity audience, efficient use of network resources results. The amount of on-line digital content that is generated and transmitted over a network to those unlikely to have any interest is reduced while accurately targeting those who have an interest.

In examples where the digital content includes coupons or advertisements, the process 500 may provide its output to a media buying platform. One such platform is a demand side platform (DSP), which is software that allows a user to manage (also called traffic) a campaign via advertising exchanges. Advertising exchanges are auction markets for buying and selling on-line advertising space. Site publishers can make their advertising space (e.g., their inventory) available for sale, and users can bid for that available inventory. This is often referred to as Real-Time-Biding (RTB), as advertising is sold one unit at a time, with bid submissions, ad impressions awarded to the top bidder, and advertising delivered to an individual web browser within a fraction of a second. Users may use the DSP to set bid pricing parameters, website selection limitations, geographic parameters and, of particular relevance here, an audience to target.

An instruction regarding digital content may be performed at 550 through a so-called supply side platform (SSP). Through the SSP, a user may traffic an advertising campaign on their website. Bid and pricing parameters are not applicable, but users are able to designate which ads to traffic where on the site, which audience to target and hierarchies for the delivery of multiple simultaneous campaigns.

Figure 6:
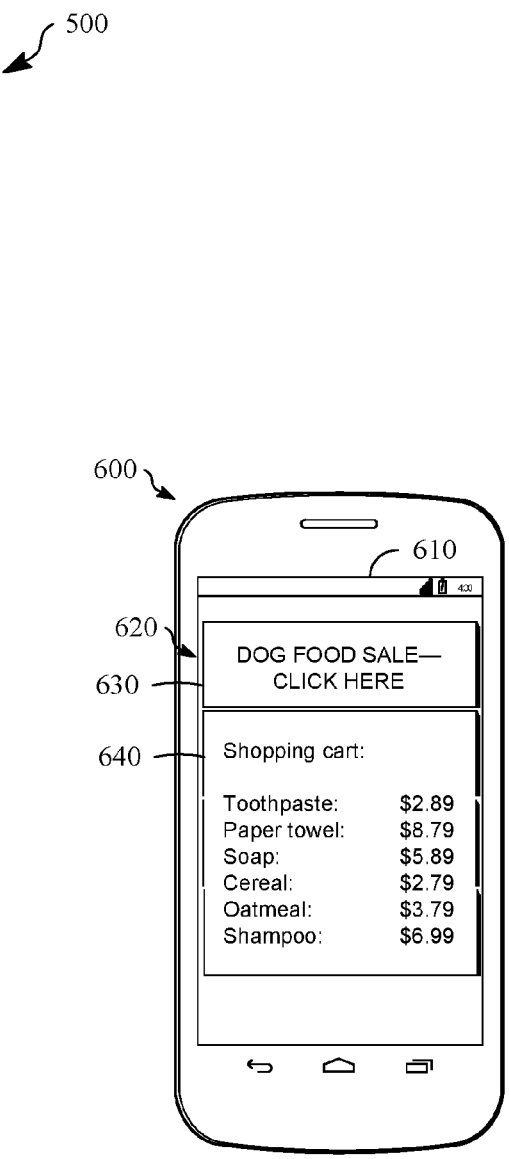
FIG. 6 is an illustration showing a user interface for displaying digital content to an audience member found during the process of FIG. 5.

FIG. 6 is an illustration showing one example of a user device 600 having a display screen 610 where a user interface 620 presents content for display at the display screen 610. This is just one example, and the particular presentation of on-line digital content is not so limited in any of format, content or device. The user interface 620 can be utilized in the context of any type of application to deliver any type of information. In this case, the user interface 620 is used to concurrently present a first user interface element 630 that displays an advertisement (i.e., a targeted ad) to an audience member found during the process 500 in response to the instructions at 550. In this example, first user interface element 630 is an active user interface elements that may be activated in response to a user input (e.g., clicking or tapping the interface element). The advertisement is displayed with a second user interface element 640, which contains in part a grocery list. Second user interface element 640 is a static user interface element in this example.

The foregoing description uses audience browsing (including shopping, etc.) behaviors across all visitors (or users) to a site to create clusters. A defined set of users with a known value, such as users who are known to have recently consumed on-line content (including, for example, purchasing a product on line), is used as an audience that will be emulated in the look-alike process. Other inputs can be used for clustering, desirably against all users depending on where the content is directed and data availability. Off-line and on-line history data can be used if there is broad coverage against the audience. In some implementations, third-party data provider contextual history or open-web page views can be used as audience input data to apply look-alike processes for an audience who may have never visited the target site (such as an e-commerce page).

To examine the improvement resulting from adjusted text according to the teachings herein, tests were performed using a retail dataset of approximately 40 million users with audience data for a 30-day period. Look-alike audiences of a vastly expanded size over the input audience were created with relatively high compositional lift levels in 93% of the tests. In one typical example, a target audience that was roughly 1.6% of the total audience size (650,000 of the 40 million) was used to generate a similarity audience of 1.5 million members incremental to the original audience of 400,000. The composition index was 765. Comparative results produced a similarly-sized audience, but at a compositional index of between 300 and 500. This is an improvement in the inclusion of original target members at a rate three times higher than a random selection of users. Such results can have significant revenue implications with more efficient spend, including usage of network resources and computational load.

It also appears that target accuracy is improved, although more data is desirable to confirm this aspect. Targeting accuracy is a measure of total model performance as follows:

$$\frac{\text{(True positive} + \text{True negative)}}{\text{(True positive} + \text{False positive} + \text{True negative} + \text{False negative)}}$$

As can be seen, this relates to the number of correct predictions (recommendations) from all predictions made and is a number between 0 and 1. The higher the number, the better the targeting accuracy. For example, if the goal is to target potential buyers of Product X, targeting accuracy measures how well the process described herein can identify actual purchasers of Product X within the larger group of consumers that may or may not have purchased Product X. In this case, the equation above describes the rate at which the process or model sorts audience members into groups of potential purchasers (in-target) and potential non-purchasers (out-of-target) versus the rate at which actual purchasers are classified as non-purchasers and non-purchasers are classified as purchasers.

As used herein, information, signals, or data are received by transmission or accessing the information, signals, or data in any form, such as receiving by transmission over a network, receiving by accessing from a storage device, or receiving by user operation of an input device.

The foregoing description describes only some example implementations of the described techniques. Other implementations are available. For example, the particular naming of the components, capitalization of terms, the attributes, data structures, or any other programming or structural aspect is not mandatory or significant, and the mechanisms that implement the systems and methods described herein or their features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a subcombination or variation of a sub-combination.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations or steps by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the scope of the appended claims.

What is claimed is:

1. A method, comprising:
receiving, for at least one website, a first plurality of data points related to each visitor of a first plurality of visitors to the website, the first plurality of data points comprising at least an identification of the visitor and an interaction of the visitor with the website;
receiving, at a computing device, a target audience comprising at least some of the first plurality of visitors having a known, desired interaction;
receiving, responsive to a user input to the computing device, a plurality of selection rules defining tolerances for a similarity audience, the plurality of selection rules including a correlation score and an audience composition index;
selecting, using the computing device, the similarity audience from a plurality of clusters defined by a number of unique visitors, at least some of the unique visitors sharing at least one interaction in common, and the similarity audience comprising at least one cluster of the plurality of clusters satisfying the plurality of selection rules; and
generating, from the computing device and for electronic transmission to a plurality of computing devices associated with members of the similarity audience, digital content.

2. The method of claim 1, further comprising:
generating a cosine similarity index for each cluster of the plurality of clusters using the target audience as input, wherein the correlation score is a minimum value for the cosine similarity index of clusters of the plurality of clusters forming the similarity audience.

3. The method of claim 1, wherein the audience composition index is calculated according to:

$$I = \frac{\left(\frac{A}{B}\right)}{\left(\frac{C}{D}\right)} * 100$$

wherein
I is the audience composition index;
A is a number of visitors having the known, desired interaction within the similarity audience;
B is a total number of visitors within the similarity audience;
C is a total number of visitors having the known, desired interaction within the plurality of clusters; and
D is a total number of visitors within the plurality of clusters.

4. The method of claim 1, further comprising, before receiving the first plurality of data points:
receiving, for at least one website, a second plurality of data points related to each visitor of a second plurality of visitors to the website, the second plurality of data points comprising at least an identification of the visitor and an interaction of the visitor with the website; and
performing a clustering algorithm that generates the plurality of clusters using the second plurality of data points as input, the second plurality of data points being a sparse data set.

5. The method of claim 4, further comprising:
generating, for a cluster of the plurality of clusters, at least one assignment rule that associates a behavior common to at least some of the unique visitors in the cluster, with the cluster; and
assigning each visitor of the first plurality of visitors to at least one cluster of the plurality of clusters, before selecting the similarity audience, using the at least one assignment rule.

6. The method of claim 5, further comprising:
re-assigning at least some visitors of the second plurality of visitors to at least one cluster of the plurality of clusters, before selecting the similarity audience, using the at least one assignment rule.

7. The method of claim 4, further comprising, after receiving the first plurality of data points and before selecting the similarity audience:
  performing the clustering algorithm using the first plurality of data points and the second plurality of data points to generate the plurality of clusters.

8. The method of claim 4 wherein the clustering algorithm is an iterative clustering algorithm that continues forming clusters until the number of unique visitors in respective clusters of the plurality of clusters is within a defined range of a total number of unique visitors.

9. The method of claim 8 wherein the number of unique visitors varies no more than 10%.

10. The method of claim 8 wherein the clustering algorithm is a spherical k-means clustering algorithm that associates at least some of the second plurality of visitors with more than one cluster of the plurality of clusters.

11. A method, comprising:
  receiving, for at least one website, a first plurality of data points related to each visitor of a first plurality of visitors to the website, the first plurality of data points comprising at least an identification of the visitor and an interaction of the visitor with the website;
  performing, using a computing device, a clustering algorithm that generates a plurality of clusters using the first plurality of data points as input, each cluster of the plurality of clusters defined by a number of unique visitors and at least some of the unique visitors sharing at least one interaction in common;
  generating, for each cluster of the plurality of clusters, at least one assignment rule that associates a behavior common to at least some of the unique visitors in the cluster with the cluster;
  providing the at least one assignment rule to an updating process that assigns each visitor of a second plurality of visitors to the plurality of clusters using the at least one assignment rule; and
  providing the plurality of clusters to a targeting process that generates a similarity audience formed of at least some of the clusters and provides, via electronic transmission, at least some members of the similarity audience with digital content.

12. The method of claim 11, further comprising:
  receiving, for at least one website, a second plurality of data points related to each visitor of a third plurality of visitors to the website, the second plurality of data points comprising at least an identification of the visitor and an interaction of the visitor with the website;
  receiving a target audience comprising at least some of the third plurality of visitors having a known, desired interaction;
  receiving a plurality of selection rules defining tolerances for a similarity audience, the plurality of selection rules including a correlation score and an audience composition index;
  selecting the similarity audience from the plurality of clusters, the at least some of the plurality of clusters forming the similarity audience satisfying the plurality of selection rules; and
  generating, to a plurality of computing devices associated with the at least some members of the similarity audience, the digital content.

13. The method of claim 11, further comprising:
  receiving, for at least one website, a second plurality of data points related to each visitor of a third plurality of visitors to the website, the second plurality of data points comprising at least an identification of the visitor and an interaction of the visitor with the website;
  assigning each visitor of the third plurality of visitors to at least one cluster of the plurality of clusters using the at least one assignment rule;
  re-assigning at least some visitors of the first plurality of visitors to at least one cluster of the plurality of clusters using the at least one assignment rule;
  determining whether to replace the plurality of clusters; and
  upon a determination to replace the plurality of clusters:
    performing the clustering algorithm a second time using the second plurality of data points and the first plurality of data points associated with the at least some visitors of the first plurality of visitors as input; and
    providing, to the targeting process, the plurality of clusters generated by performing the clustering algorithm the second time;
  otherwise:
    providing, to the targeting process, the plurality of clusters after the assigning and the re-assigning.

14. The method of claim 13 wherein determining whether to replace the plurality of clusters comprises at least one of:
  determining whether at least one of the plurality of clusters is larger than a desired cluster size;
  determining whether at least a defined period of time has passed between receiving the first plurality of data points and receiving the second plurality of data points; or
  determining whether at least one website exhibits a change in a taxonomy used to generate the plurality of clusters using the first plurality of data points.

15. An apparatus, comprising:
  a memory; and
  at least one processor configured to execute instructions stored in the memory to:
    receive, for at least one website, a first plurality of data points related to each visitor of a first plurality of visitors to the website, the first plurality of data points comprising at least an identification of the visitor and an interaction of the visitor with the website;
    receive a target audience comprising at least some of the first plurality of visitors having a known, desired interaction;
    receive, responsive to a user input, a plurality of selection rules defining tolerances for a similarity audience, the plurality of selection rules including a correlation score and an audience composition index;
    select the similarity audience from a plurality of clusters defined by a number of unique visitors, at least some of the unique visitors sharing at least one interaction in common, and the similarity audience comprising at least one cluster of the plurality of clusters satisfying the plurality of selection rules; and
    generate, for electronic transmission to a plurality of computing devices associated with members of the similarity audience, digital content.

16. The apparatus of claim 15, the processor configured to:
  generate a cosine similarity index for each cluster of the plurality of clusters using the target audience as input;
  wherein the correlation score is a minimum value for the cosine similarity index of each cluster of the plurality of clusters forming the similarity audience.

17. The apparatus of claim 15, the processor configured to:
receive, before receiving the first plurality of data points and for at least one website, a second plurality of data points related to each visitor of a second plurality of visitors to the website, the second plurality of data points comprising at least an identification of the visitor and an interaction of the visitor with the website; and
perform a clustering algorithm to generate the plurality of clusters using the second plurality of data points as input before receiving the first plurality of data points.

18. The apparatus of claim 17, the processor configured to:
perform, before selecting the similarity audience, the clustering algorithm to update the plurality of clusters using the first plurality of data points and at least some of the second plurality of data points as input.

19. The apparatus of claim 17, the processor configured to:
generate, for each cluster of the plurality of clusters, at least one assignment rule that associates a behavior common to at least some of the unique visitors in the cluster, with the cluster;
assign each visitor of the first plurality of visitors to at least one cluster of the plurality of clusters, before selecting the similarity audience, using the assignment rules; and
re-assign at least some visitors of the second plurality of visitors to at least one cluster of the plurality of clusters, before selecting the similarity audience, using the assignment rules.

20. The apparatus of claim 17 wherein the clustering algorithm is an iterative spherical k-means clustering algorithm that continues forming clusters until the number of unique visitors in each cluster of the plurality of clusters is varies no more than a defined percentage.

* * * * *